June 19, 1956
M. LUDWIG
2,751,210
CONVEYOR HEAD SHAFT
Filed March 5, 1953
2 Sheets-Sheet 2
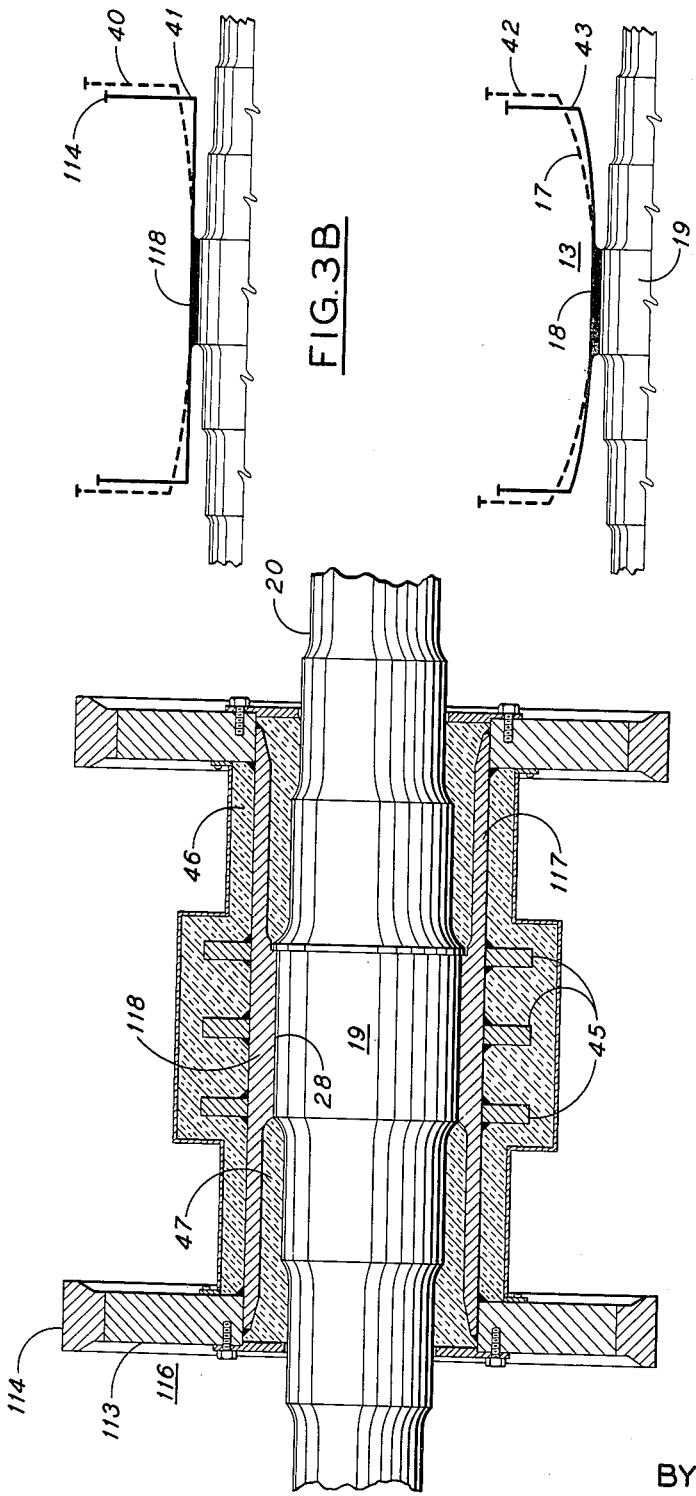
INVENTOR
MILTON LUDWIG
BY
ATTORNEYS

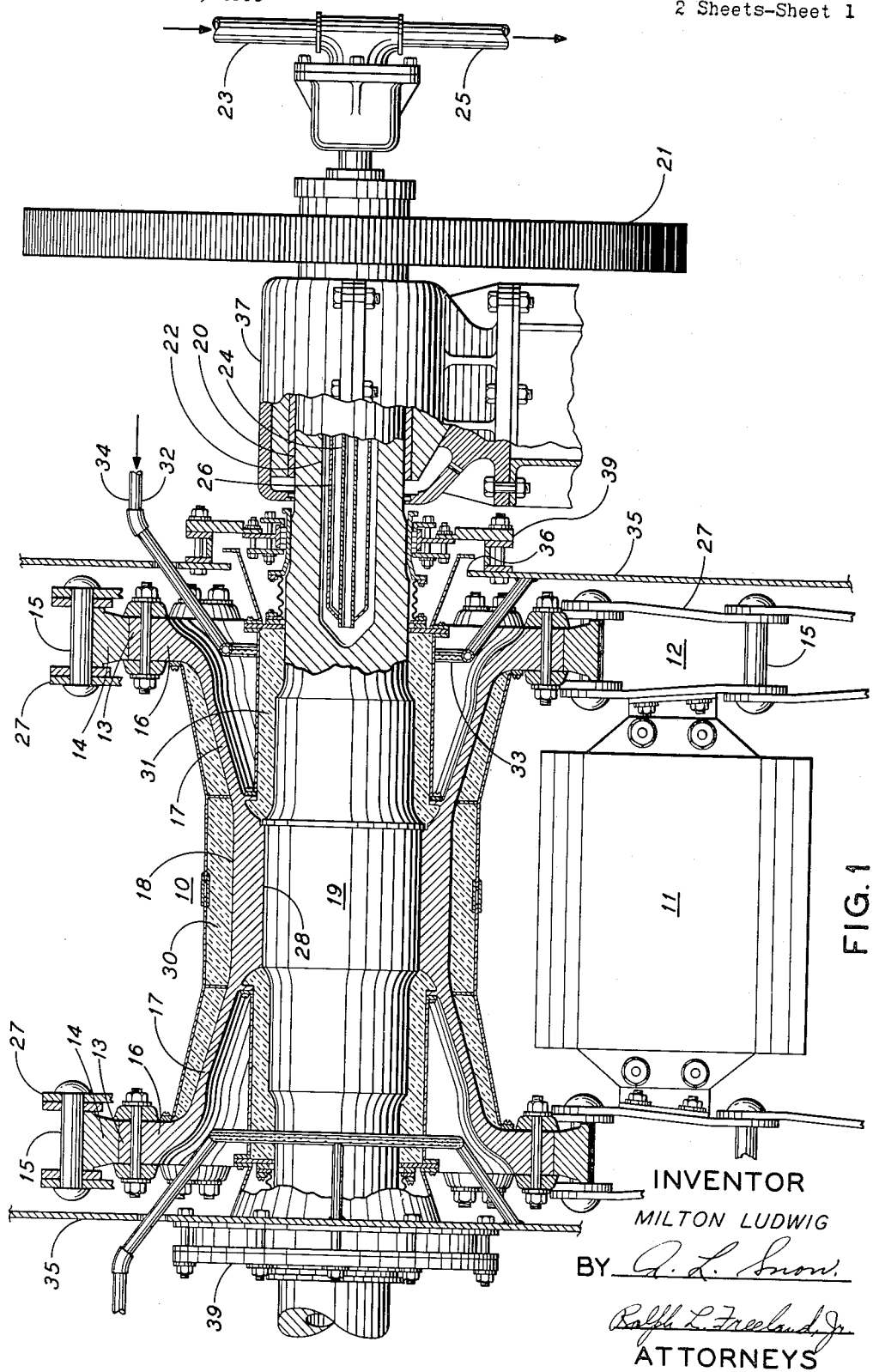

United States Patent Office 2,751,210
Patented June 19, 1956

2,751,210

CONVEYOR HEAD SHAFT

Milton Ludwig, Berkeley, Calif., assignor to California Research Corporation, San Francisco, Calif., a corporation of Delaware Application March 5, 1953, Serial No. 340,599

9 Claims. (Cl. 263—8)

The present invention relates to conveyor systems of the elevator type and more particularly to a wheel and shaft assembly for driving a pair of endless load-carrying members by means of which hot particulate material may be conveyed.

In the conveying of hot particulate material, such as catalyst beads, in a catalytic, hydrocarbon conversion system, an elevator system may be used to transport the catalyst beads between a regeneration zone and a contact zone. Under normal operating conditions, the conveying mechanism, including the head shaft and wheel assembly, which drive the endless chains and buckets, is subjected to temperature conditions approaching that of the catalyst material which is maintained at elevated temperatures of about 800 to 1100° F. It is desirable to convey the bead catalyst at these temperatures in order to prevent unnecessary loss of heat during the transportation of the material between the regeneration zone and the contact zone. Accordingly, it is necessary that the drive shaft and head wheel assembly, which provides the driving torque for the conveyor system, be operated in a range of temperatures approximating that of the catalyst.

There is illustrated and described in U. S. Patent 2,607,637 a head wheel and shaft arrangement for an elevator system in which the driving flanges or traction rims are mounted upon a wheel and shaft assembly. In that arrangement the two wheels comprise a plurality of concentric annular members. Each successively larger annular ring forming the wheels is mounted upon an adjacent smaller ring by an interference or shrink fit. The wheel is mounted directly upon the shaft adjacent the bearings ends of the shaft by a shrink fit between the smallest ring and the shaft. The arrangement of the patent is quite satisfactory for conveying materials where the temperature difference between the traction rim and the portion of the shaft upon which the wheel is mounted does not exceed about 250° F. However, it has been found very difficult to maintain the essential shrink fits between the successive rings when the temperature difference exceeds about 250° F. Accordingly, the maintenance of a driving connection between the traction rim and drive shaft through such shrink fits is very difficult.

In carrying out the present invention there is provided in an elevator system for hot particulate material a head wheel and shaft assembly having a flexible transition section connecting the journal portions of the shaft and the traction portions of the wheel. Said wheel and shaft assembly is adapted to drive a pair of endless load-carrying members and comprises a shaft arranged to be supported at its opposite ends by a pair of bearings and a single wheel having a central hub portion concentrically supported on the central portion of said shaft. Further, in accordance with the invention said wheel is provided with said flexible connection by axially-elongated transition portions extending from the central hub portion toward the bearings ends of the shaft. The transition portions are so arranged with respect to the shaft as to diverge radially therefrom in a conical or bell-like form when the shaft and wheel are heated to operating conditions. Radially-extending traction rim members are formed adjacent the outer ends of said flexible transition portions for engaging the endless load-carrying means of the conveyor system.

In a preferred form of the invention the transition portions between the hub portion and the traction rim members or flanges are initially radially divergent from the shaft and assume an increased angle with respect to the shaft when the shaft and wheel are heated to operating conditions. In an alternative form of the invention the transition portions are initially substantially parallel to the axis of the shaft, but upon heating of the shaft and wheel to operating conditions the transition portions diverge radially from the shaft into said conical form.

Still further, in accordance with the invention, insulation means may be provided along the shaft between the transition portions and said shaft. Likewise, insulation means may be provided along the outer surface of the head wheel between the two flanged portions to prevent the absorption of heat radiation from the conveyed material and the endless conveyor system therefor. Desirably, cooling means, including means for spraying steam, may be provided between the transition portions of said wheel and the shaft.

Further objects and advantages of the present invention will become apparent from the following detailed description taken in conjunction with the accompanying drawings, which form an integral part of the present specification.

In the drawings, Fig. 1 is a side elevation view, partially in section, of a head wheel and shaft assembly in accordance with the present invention, and illustrative of the cooperative relationship between said assembly and a catalyst elevator system.

Fig. 2 is a side elevation of an alternative form of wheel and shaft assembly constructed in accordance with the present invention, in which the wheel portion of the assembly is shown in cross-section.

Figs. 3A and 3B are diagrammatic representations of the manner in which the transition portions of the wheels, respectively illustrated in Figs. 1 and 2, expand under elevated temperature operating conditions of the head shaft and wheel assembly.

Referring now to the drawings, there is shown in Fig. 1 a preferred form of the invention in which a head wheel and shaft assembly 10 is arranged to drive an elevator arrangement, including buckets 11 and endless chains 12, through the outer flanges 13, upon which driving tires or rims 14 are mounted. Drive of endless load-carrying members 12 is through knuckles 15. Knuckles 15 frictionally engage the surface of driving tires 14, which are secured to the flange portion 13 of wheel 16 by an interference or shrink fit. Drive of the flanges 13 is provided through a flexible connection which includes the transition sections 17, hub portion 18 and shaft 19 from the central portion 28 thereof to the bearing ends 20 of shaft 19. Bearing ends 20 are supported in journal bearings, one of which is designated as 37. As shown, a gear 21 secured to one of the bearing ends 20 of shaft 19 provides a driving connection to any suitable prime mover, such as a turbine or electric motor (not shown).

For the purpose of preventing the temperature of the bearing ends 20 of shaft 19 from exceeding a temperature range within which the bearing may be easily lubricated, the ends of shaft 19 are preferably bored out, as at 22, to provide cooling within the shaft. Cooling fluid may be introduced through pipe 23 and the coolant conducting tubing 24 inserted into bore 22. Withdrawal of coolant after heat exchange with shaft 19 is provided through tube 25, which likewise communicates with tube 26 disposed within bore 22.

With the bearing ends 20 of shaft 19 cooled in the manner set forth above, the temperature of the bearing ends will be not greater than about 150° F. However, as explained hereinbefore, the catalyst material in buckets 11 may be conveyed at a temperature of about 1100° F. and the radiation of heat from the material, buckets 11, side arms 27 of endless chains 12, and the knuckles 15 of said chain radiate heat to the traction rims 14 of wheel 16 so that the driving rims are required to operate at a temperature of about 900 to 950° F. Accordingly, it will be seen that the temperature difference between the rims 14 and the bearing ends of shaft 19 will be in the range of about 700 to 800° F. Since it is desirable to fabricate the driving rims 14 from a harder material than that utilized in the remaining portions of wheel 16, it is highly desirable to maintain the shrink fit between flange 13 and tire or rim 14 under the above-described, elevated operating temperatures.

In accordance with the present invention, flexible, conical transition sections 17 are provided between traction rim 14 and land 28 of driving shaft 19, upon which hub 18 is mounted by means of another shrink fit. This transition section enables traction rims 14 to expand radially under the above-mentioned temperature conditions without introduction of excessive stresses in wheel 16 and without loss of shrink fits between either traction rim 14 on wheel 16 or wheel 16 on shaft 19. With this arrangement of transition sections 17, the temperature difference may range up to 500 to 600° F. and still maintain the desired shrink fits between shaft and driving rims with acceptable stresses in the drive wheel.

For the purpose of reducing heat loss through the shaft and maintaining controlled temperature conditions along the flexible transition portions and the shaft, wheel and shaft assembly 10 is provided with insulation and cooling means which prevent radiation of heat from hotter parts of the assembly to colder parts of the assembly. In particular, radiation from buckets 11 in endless conveyor tracks 12, which would act as a shunt resistance to the resistance to heat flow of transition section 17, is substantially eliminated by insulation 30. Insulation 30, as shown, extends from each radially extending flange 13 across both transition sections 17 and the hub section 18. To prevent radiation from flange 13 and transition section 17 to shaft 19, insulation 31 is provided along the length of shaft 19 from the hub portion to a point along the surface of the shaft substantially adjacent the end of bore 20. In addition to the insulation 30 and 31, means may be provided for spraying steam between the shaft and the radially-divergent portion of wheel 16 including transition sections 17 and the inner surface of flanges 13. As shown, this steam spraying means, designated generally as 32, may include a perforated ring 33 encircling shaft 19 and lying within the space defined by transition 17 and flange 13. The steam is introduced through line 34 into ring 33. Due to the opaqueness of steam to heat radiation, the steam sprayed into the space between bell-like portion 17 of wheel 16 and shaft 19 is capable of absorbing heat radiation and thereby reducing the temperature of wheel and shaft assembly 10.

In a commercial embodiment of head wheel and shaft assembly 10, as illustrated in Fig. 1, the elevator system generally is positioned within a housing which includes vertical walls 35 disposed on opposite sides of the wheel. Shaft 19 of the assembly, including the bearing ends, passes through walls 35 by way of openings 36 in wall 35. Opening 36 is preferably provided with suitable baffling, indicated as 39, to prevent the outward flow of air and heat around shaft 19 and the bearings 37.

An alternative form of the present invention is illustrated in Fig. 2, which differs from the arrangement of Fig. 1 primarily in the arrangement of the flexible transition section 117 of wheel 113. As shown, flexible transition section 117 extends axially from the center support on shaft 19 toward the bearing ends 20. However, it will be noted that transition sections 117 are substantially parallel to the axis of shaft 19 when in an unheated or non-operating condition. Under normal operating temperature conditions, with transition section 117 subjected to a high temperature gradient between hub section 118 and the tire members 114 mounted on radially-extending flanges 113, the angle between transition section 117 and the axis of the shaft increases. This increasing angular relationship between the shaft and transition piece 117 of wheel 116 is particularly illustrated in Fig. 3B. As diagrammatically represented therein, the heated and unheated conditions of wheel 116 are respectively shown by dotted lines 40 and solid lines 41. As indicated by dotted line 40, that portion of wheel 116 extending from hub portion 118 toward the traction rim portions 114, when heated, assumes a bell-like or conical configuration.

Fig. 3A is a schematic representation similar to Fig. 3B and illustrates the heated and unheated condition of the arrangement of the head wheel and shaft assembly described in connection with Fig. 1. The manner in which flexible transition section 17 assumes greater divergence outwardly from shaft 19 when the wheel is heated to an operating condition is shown by dotted line diagram 42. Solid line diagram 43 is illustrative of the operating condition of wheel 3 under ambient or unheated temperature conditions. It will be observed by comparison of the diagrams in Figs. 3A and 3B that excessive stresses are avoided in both arrangements due to the ability of the wheels to change shape through the flexible transition portions when heated to elevated operating temperatures.

Referring again to the arrangement of Fig. 2, it will be observed that the hub portion 118 of wheel 116 includes a plurality of annular stiffening rings 45 which may be welded to the outer circumference of the hub portion 118 of wheel 116. Rings 45 increase the radial forces of the shrink fit between hub 118 and the center land 28 on shaft 19.

Insulation may be provided along the outer surface of hub section 118 and the transition section 117 to prevent the absorption of heat radiation from the buckets and the conveyor chains. This insulation is designated generally as 46. Similarly, insulation is provided in the space between the inner surface of transition sections 117 and the surface of shaft 19. This insulation is designated as 47. A particular advantage of the arrangement of Fig. 2 resides in the ability to fabricate the transition portions 117 and hub portion 118 from rod or tubular material rather than requiring casting thereof as in the arrangement of Fig. 1.

It will be apparent that in both embodiments of the invention an elongated, high-resistance heat-flow path is provided by the transition section 17 or 117. The resistance to heat flow is in general controlled by the conductivity of the metal and the thickness of the flexible transition sections. As shown, these sections are relatively thin as compared to the length of the axially extending portion of the transition sections and thereby introduce a relatively high-resistance heat-flow path between the driving rims and the journal bearings.

From the foregoing description it will be apparent that in accordance with the present invention there is provided a wheel and shaft assembly for an elevator system in which hot particulate material may be conveyed without introduction of excessive thermal stresses into the assembly and without undue loss of heat from the conveyed material. Additionally, said assembly permits the use of low temperature bearings with less temperature variation along the length of the bearings and may permit the use of a shorter shaft operating at a lower maximum temperature. Such an arrangement is made possible by the provision of a flexible, relatively thin, transition section between the heat source at the traction rim or driving tire portion of the head wheel and the centrally located hub portions of the wheel.

I claim:

1. In a conveyor system, a wheel and shaft assembly for driving a pair of endless load-carrying means comprising a shaft adapted to be supported at its opposite ends by a pair of bearings and a wheel having a single hub portion concentrically supported on the central portion of said shaft, said wheel having axially elongated transition portions extending from said single hub portion toward the opposite ends of said shaft, said transition portions being radially divergent from said hub portion toward said opposite ends of said shaft when said shaft and said wheel are heated to operating conditions and radially-extending traction rim members formed adjacent the outer ends of said transition portions for engaging said endless load-carrying means of said conveyor system.

2. In a conveyor system, a wheel and shaft assembly for driving a pair of endless load-carrying members comprising a shaft adapted to be supported at its opposite ends by a pair of bearings and a wheel having a single hub portion concentrically supported intermediate the ends of said shaft, said wheel having axially elongated transition portions extending toward the opposite ends of said shaft, said elongated portions being redially divergent from said hub portion toward said opposite ends of said shaft when said shaft and said wheel are heated to operating conditions and radially-extending traction rim members formed adjacent the outer ends of said transition portions for engaging said endless load-carrying members of said conveyor system, said rim members including a tire mounted upon each of said rim members to provide a driving connection between said wheel and said endless load-carrying members.

3. In an elevator system for hot, particulate material, a head wheel and shaft assembly comprising a shaft adapted to be supported by a pair of bearings at the opposite ends thereof, said shaft having a raised land portion in the center thereof of greater diameter than the remaining portion of said shaft, a head wheel having a single hub portion supported on the land of said shaft, said head wheel having axially-elongated transition portions extending toward the bearing ends of said shaft, said transition portions being radially divergent from said hub portion toward said bearing ends of said shaft when said shaft and said wheel are heated to operating conditions, radially-extending flanges formed at the outer ends of said transition portions for supporting a tire upon each of said flanges, said tires being seated on said flanges by a shrink fit therebetween.

4. In an elevator system for hot, particulate material, a head wheel and shaft assembly comprising a shaft adapted to be supported by a pair of bearings at the opposite ends thereof, said shaft having a raised land portion in the center thereof of greater diameter than the remaining portion of said shaft, a head wheel having a single central portion supported on the land of said shaft, said head wheel having axially-elongated transition portions extending toward the bearing ends of said shaft, said transition portions being of bell-like form flaring outwardly from said central portion toward said bearing ends of said shaft when said shaft and said wheel are heated to operating condition, radially-extending traction rims formed adjacent the outer ends of said bell-like portions for supporting a tire on each of said rims, and insulation means along said shaft from said raised land to a point adjacent the bearing ends of said shaft to prevent heat transfer by radiation between said elongated portions of said wheel and said shaft.

5. In an elevator system for hot, particulate material, a head wheel and shaft assembly comprising a shaft adapted to be supported by a pair of bearings at the opposite ends thereof, said shaft having a raised land portion in the center thereof of greater diameter than the remaining portion of said shaft, a head wheel having a single central portion supported on the land of said shaft, said head wheel having axially-elongated transition portions extending toward the bearing ends of said shaft, said elongated portions being of bell-like form flaring outwardly from said central portion toward said bearing ends of said shaft when said shaft and said wheel are heated to operating condition, radially-extending traction rims formed adjacent the outer ends of said bell-like portions for supporting a tire on said rims, first insulation means along said shaft from said raised land to a point adjacent the bearing ends of said shaft to prevent heat transfer by radiation from said transition portions to said shaft, second insulation means extending axially along the outside of said wheel between said rim portions to prevent heat transfer by radiation from the conveyed material to said transition portions of said wheel, and cooling means including means for spraying steam between said transition portions and said shaft to cool said transition portion by absorbing heat radiation therefrom.

6. In a hot catalyst conveyor system a head wheel and shaft assembly comprising a shaft adapted to be supported at its opposite ends in a pair of bearings, said shaft having a pair of bores extending axially inward from the ends of said shaft for cooling the bearing ends of said shaft, wheel support means on said shaft including a radially enlarged portion in the center of said shaft, a head wheel having its center hub portion supported solely upon said radially-enlarged portion and having flexible transition sections flaring outwardly from said center hub portion toward the opposite ends of said shaft to form a bell-like configuration extending axially and radially outward from the center support when said wheel and shaft are operated at elevated temperatures, tire members supported upon radially-extending rim portions formed at the outer ends of said bell-like shapes, and insulation means extending axially along said shaft from said radially enlarged portion to a point adjacent the ends of said bores in said shaft.

7. A head wheel and shaft assembly in accordance with claim 6, in which the flexible transition sections of said wheel are initially substantially parallel to the axis of said shaft.

8. A head wheel and shaft assembly in accordance with claim 6, in which the flexible transition sections of said wheel are initially conical in form with the apexes of the cones converging toward the center support on said shaft.

9. A wheel and shaft assembly for a hot material conveyor system having a predetermined high-resistance heat flow path between the journaled portions of the shaft and the traction portions of the wheel, said wheel being adapted to engage endless load-carrying means for said hot material comprising a shaft adapted to have its ends journaled in a pair of bearings, and a wheel having a single central hub portion concentrically supported on the central portion of said shaft, said wheel having axially elongated transition portions extending from said hub portion toward the journal ends of said shaft, said elongated portions being radially divergent outwardly from said hub portion and said shaft toward the journaled ends of said shaft when said shaft and said wheel are heated to operating conditions, and radially-extending traction rim members formed adjacent the outer ends of said elongated portions for engaging said endless load-carrying means of said conveyor system whereby the resistance to heat flow is serially through said rim members, said transition portions and said hub portions of said wheel and through said shaft from said central portion to said journaled ends.

References Cited in the file of this patent

UNITED STATES PATENTS

| | | |
|---|---|---|
| 2,497,154 | Dailey et al. | Feb. 14, 1950 |
| 2,579,749 | Mercier | Dec. 25, 1951 |